Figure 1:
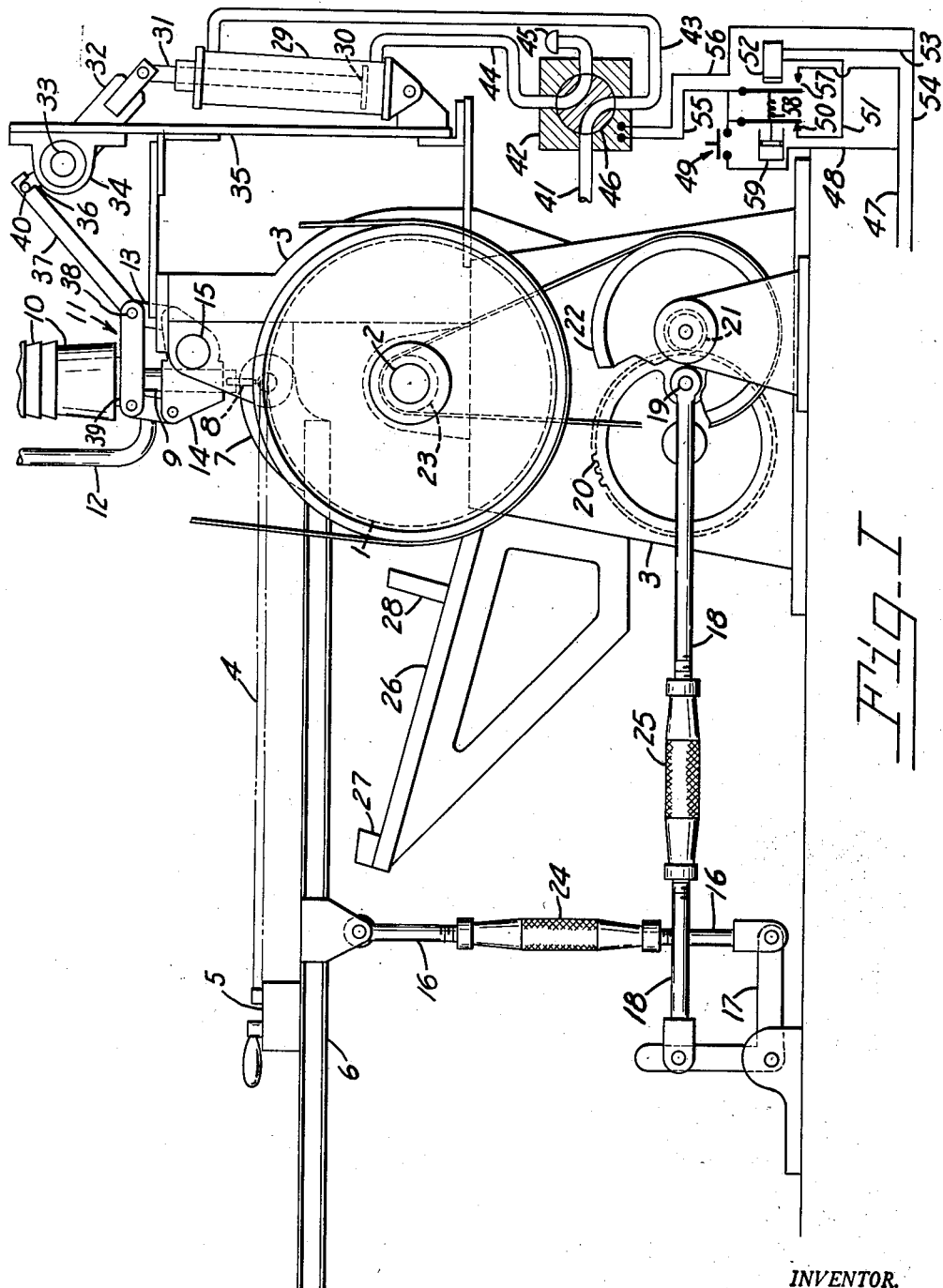

Sept. 30, 1952  H. H. HEFFLEY  2,612,006
GLASS BEVELING MACHINE
Filed May 16, 1949  3 Sheets-Sheet 1

INVENTOR.
Howard H. Heffley
BY
Marshall, Marshall & Leonard
ATTORNEYS

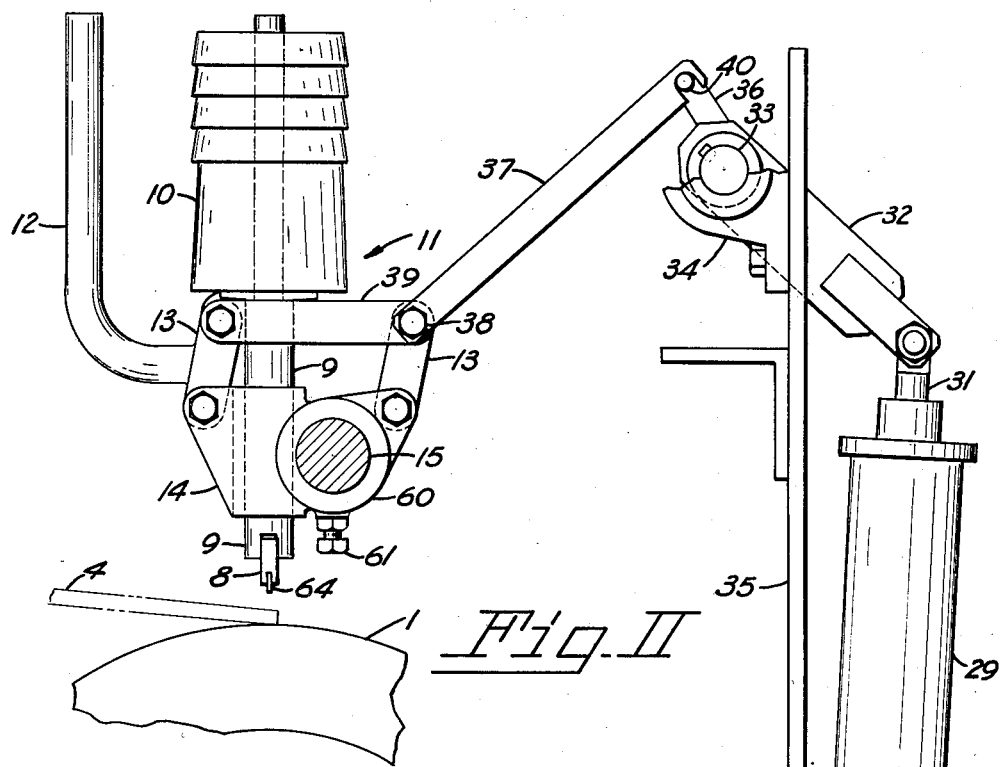
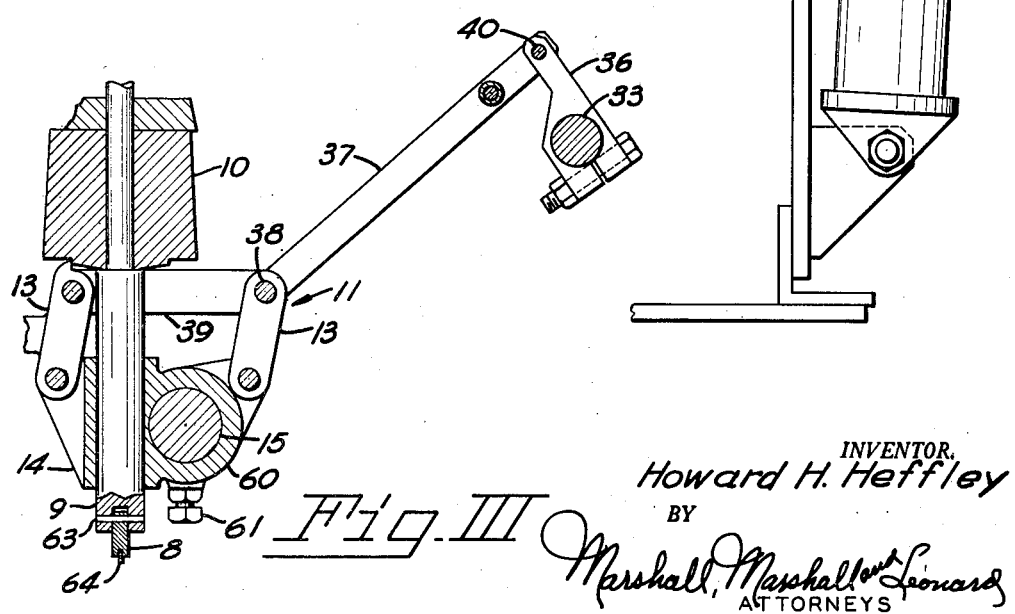

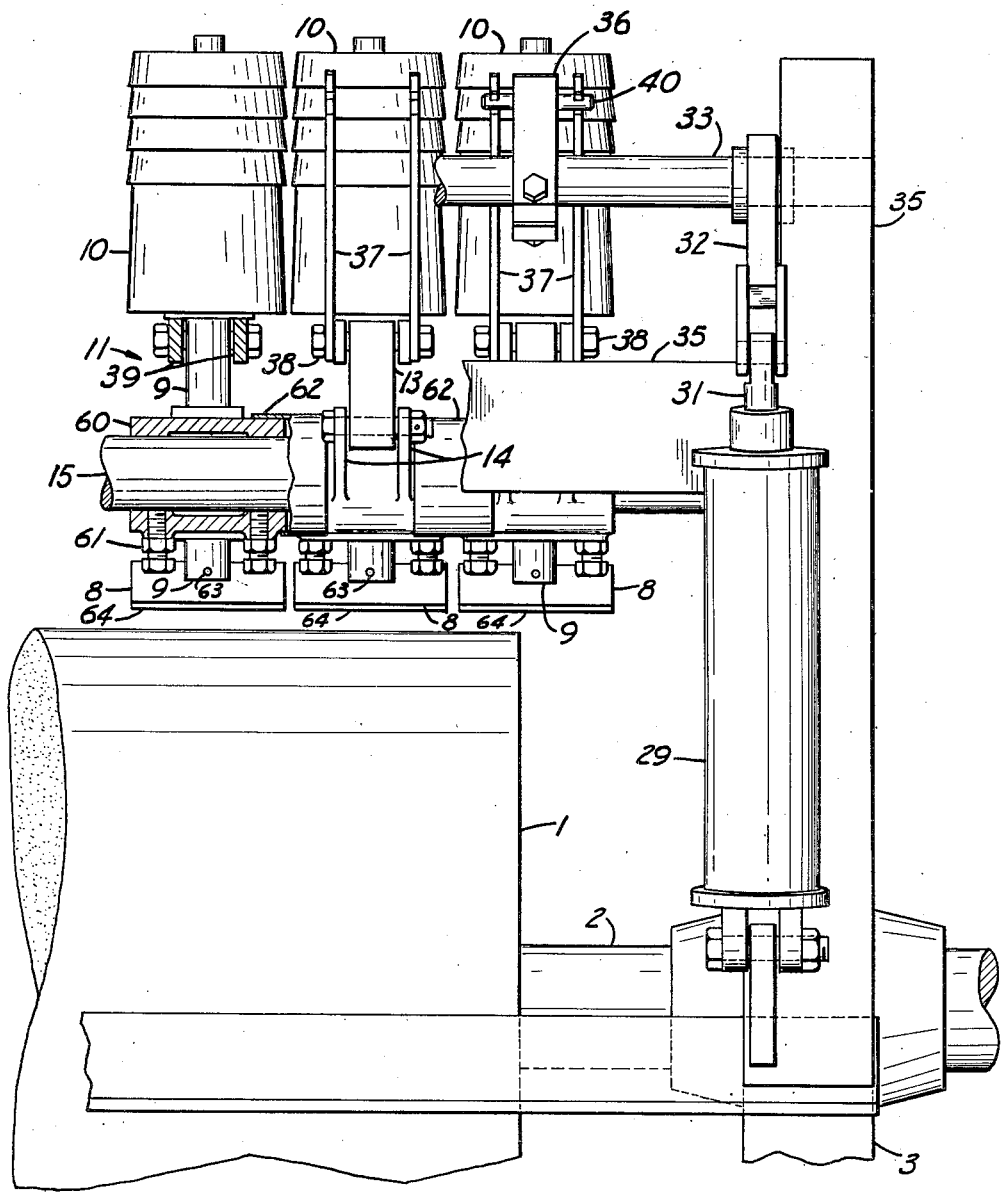

Patented Sept. 30, 1952

2,612,006

UNITED STATES PATENT OFFICE 2,612,006

GLASS BEVELING MACHINE

Howard H. Heffley, Toledo, Ohio, assignor to The Toledo Plate & Window Glass Company, Toledo, Ohio, a corporation of Ohio Application May 16, 1949, Serial No. 93,436

5 Claims. (Cl. 51—96)

This invention relates to glass working apparatus and in particular to improvements in a machine for beveling the edges of a sheet of glass.

One of the problems to be solved, particularly in the manufacture of glass for mirrors, is to quickly and economically grind the bevels that serve as trim around the edge of the sheet of glass. It is desirable that this operation be as completely automatic as possible so as to minimize the marring of the glass that occurs during the handling of the glass in ordinary beveling operations.

The machine which incorporates this invention is constructed for beveling the straight edges of sheets of glass by presenting the full length of the edge of the glass to be beveled to a surface of a long cylindrical grinding stone that is rotated and oscillated lengthwise of its axis to grind the glass, the glass sheet itself being oscillated generally about its line of contact with the grinding stone so as to distribute the grinding over the full width of the beveled surface and producing a substantially flat beveled surface. In such a machine it is necessary to weight the edge of the glass in order to hold it in contact with the grinding stone and the width of the bevel is determined by the length of time that the glass is held against the rotating stone. In a beveling machine of this type the weights are varied to apply proper pressures along the edges to be beveled and are provided with individual jacks. After the operator of the machine places a sheet of glass in position the weights must be lowered gently and in proper order so that the full width of glass is weighted heavily at some points and less heavily at others. After allowing the machine to run for a prescribed length of time the weights are raised and the operator removes the sheet of glass. Manual operation of the weights would be awkward because the weights are not readily accessible from the operator's position while loading the glass onto the machine. Furthermore manual operation would be subject to errors because the operator would be required to carefully watch the length of time that the weights are left in grinding position and would be required to remove them quickly and in symmetrical sequence.

The principal object of this invention is to improve glass beveling machines of the described variety by providing automatically controlled and operated weight lifters.

Another object of the invention is to arrange a beveling machine so that the entire length of the edge of glass being beveled is subjected to grinding pressure during the full interval of time.

A still further object of the invention is to provide automatic timing mechanism for regulating the length of time that the glass is held in grinding contact with the grinding stone.

Still another object of the invention is to provide a hydraulic cylinder and linkage operated thereby for simultaneously operating a plurality of weight lifters which weight lifters control the position of weights that serve to hold the glass in grinding contact with the grinding stone.

More specific objects and advantages are apparent from the following description in which reference is made to the accompanying drawings.

In the drawings:

Figure I is a side elevation of a glass beveling machine with the control circuit illustrated schematically.

Figure II is an enlarged end elevation, parts being shown in section, of the weight actuating mechanism.

Figure III is a vertical section showing the detail of construction of the weights and the linkage mechanism for actuating them.

Figure IV is a fragmentary rear elevation with parts shown in section to indicate the arrangement of the various parts of the weight actuating mechanism.

These specific drawings and the accompanying description are intended merely to illustrate the invention and not to limit its scope.

According to the invention a motor, preferably a hydraulic or pneumatic cylinder, is arranged to act through linkages to raise or lower a plurality of weighted shoes which collectively hold the edge of the glass being beveled in contact with a revolving grinding stone. The control for the motor includes a timer so connected in circuit that the weighted shoes are deposited on the glass for a predetermined length of time following each cycle initiating impulse furnished by the operator in charge of the machine.

Referring now to the drawings, a long cylindrical grinding stone or wheel 1 is carried on a shaft 2 that is journaled in end frames or pedestals 3 of the machine. A glass sheet 4 to be beveled is supported along one edge on the upper surface of the grinding wheel 1 and along an opposite edge on a locating bracket 5 that is adjustably mounted on a pivoted frame 6. The frame 6 includes goose-necked ends 7 that are pivotally connected to the pedestals 3 substantially in line with the line of contact between the edge of the glass and the grinding wheel.

To hold the glass against the grinding stone 1 a plurality of shoes 8 are carried on the lower ends of stems 9 carrying loading weights 10. During a beveling operation a weight jack 11 comprising a handle 12 and links 13 is moved forwardly and downwardly to allow the shoes 8 to bear on the margin of the glass sheet 4. The jacks 11 include brackets 14 that are rigidly mounted on a stationary shaft 15 extending between the pedestals 3 of the machine.

Because of the convexity of the cylindrical surface of the grinding stone 1 the stone would produce a concave bevel in the glass unless the pivoted frame 6 is oscillated about its connection to the pedestals to distribute the grinding over the width of the bevel and thus produce a substantially flat surface. The frame 6 is driven by a linkage comprising vertical struts 16, interconnected bell crank levers 17 and a horizontal strut 18 that, in the manner of a connecting rod, is connected to an eccentric pin 19 carried on a low speed gear 20. The low speed gear 20 is driven by a pinion 21 carried on the shaft of a pulley 22 that is belt connected to a small pulley 23 on the shaft 2. Thus as the grinding stone turns with the shaft 2 the bell crank levers 17 are oscillated and thus raise and lower the outer end of the frame 6 thereby slightly rotating the glass with respect to the grinding stone. Turnbuckles 24 and 25 are included in the vertical strut 16 and the horizontal strut 18 so that the angular position of the bell crank levers 17 with respect to the frame 6 and gear 20 may be varied. Likewise, adjustment is provided between the arms of the bell crank levers 17 to provide still further means of adjustment. These various adjustments are employed to secure exactly the correct angle and range of oscillation between the edge of the glass and the grinding stone and thus by change in angular relations, to vary the distribution of grinding effort across the face of the bevel. These adjustments are made empirically until a satisfactory flat beveled surface of the desired width is produced.

The number of weights 10 employed on each of the weight stems 9 may be varied to equalize the grinding action along the length of the edge of the glass. Even with the best of grinding stones some portions of the stone cut faster than others and it is therefore necessary to reduce the amount of load on those portions of the edge of the glass to prevent over-grinding in spots.

Mechanism, not shown in the drawings, is provided for oscillating the grinding stone axially as it rotates so that the stone can not develop ridges or cut grooves in the beveled surface.

An additional stationary table 26 having guide blocks 27 and 28 is provided so that the edges of the glass may be squared on the stone by being held perpendicular to the surface of the stone as they are brought into contact with it.

As is indicated in Figure IV there is a plurality of shoes 8 and weight assemblies 10 extending along the length of the grinding stone 1. As was mentioned previously the number of weights employed on each shoe may be varied according to the grinding rate of that portion of the cylindrical stone located beneath the shoe.

The weight lifting jacks 11 can be manually operated by manipulation of the handles 12. As long as the glass sheets 4 are relatively small the operator can reach over the sheet to operate the handles 12. Likewise, with small sheets there are relatively few of the weight jacks 11 that must be operated for each sheet. However, when larger sheets are to be beveled it is no longer convenient for the operator to reach the handles 12 and also more of the weights are employed so that it becomes increasingly more difficult to secure accurate timing intervals for the grinding operation. Therefore, an automatic mechanism is provided on the machine for operating the weight lifting jacks simultaneously. The control for the automatic operating mechanism also includes a timer for measuring each grinding interval and for causing the mechanism to lift the weights at the end of a predetermined time interval.

The automatic mechanism for operating the jacks, as a motor, includes a pneumatic cylinder 29 having a piston 30 which through a piston rod 31 and an arm 32 extending laterally from a shaft 33 is arranged to turn the shaft in pivot blocks 34 mounted on a framework 35 erected from the pedestals 3. A plurality of short arms 36 extending from the shaft 33 carry the upper ends of links 37 the lower ends of which are pivotally connected to pins 38 forming the pivotal connection between the generally vertical links 13 and horizontal bars 39 of the jacks 11. As may be seen in Figure II the upper ends of the links 37 are merely hooked over pins 40 in the upper ends of the arms 36 so that the links may be easily disengaged when a particular jack is to be operated individually.

Fluid for actuating the hydraulic cylinder 29 is admitted through a pipe 41 connected to a source of fluid under pressure. Preferably the hydraulic cylinder 29 is operated by air under pressure because of the smooth operation thereby obtained. The pipe 41 leading to the source of pressure is connected through a 4-way electrically operated selector valve 42 to pipes 43 and 44 leading to the cylinder 29. The return fluid from the cylinder is exhausted through a silencer 45 connected to the 4-way valve 42. When it is desired to lift the weights the valve is turned to the position shown so that the pressure fluid in the pipe 41 is transmitted through the pipe 43 to the upper end of the cylinder 29 while the pipe 44 connected to the lower end of the cylinder exhausts through the muffler 45. When the weights are to be lowered a rotor 46 of the valve 42 is turned 90 degrees from the position shown so that the pressure pipe 41 is connected to the pipe 44 and thus the lower end of the cylinder 29 while the upper end of the cylinder 29 is connected through the pipe 43 and valve 42 to the silencer 45.

The electrical control for the electrically operated selector valve 42 includes a time delay relay which is schematically illustrated in Figure I. In this circuit electrical current from a source of supply is taken through a supply lead 47, a branch lead 48, a start button 49 and through a normally closed contact 50 and lead 51 to an operating coil 52 of the relay. The operating coil 52 is also connected through a lead 53 to a return lead 54. As soon as the start button 49 is pressed current flows through this current and also through leads 55 and 56 to operate the electrically controlled valve 42 and turn its rotor 46 to effect lowering of the weights.

Current flowing through the relay coil 52 causes it to close its normally open contact 57 thereby establishing a shunt circuit from the lead 47 to the lead 55 and to the normally closed contact 50 so that the start button 49 may be released without deenergizing the relay coil 52. The movement of the moving element of the contact 57, acting through a spring 58 controlled by a dashpot 59 serves to open the normally closed contacts 50 after a selected interval of time following the energization of the relay coil 52. When the contact 50 opens the relay coil 52 is deenergized and the circuit including the valve 42 returns to the position shown.

This schematically illustrated timing circuit is illustrative only and other timing relays may be substituted for it without changing the operation of the remainder of the mechanism. The timing circuit merely serves to hold the selector valve 42 energized during a predetermined length of time and then automatically allow it to return to its normal position.

For the operator's convenience the start button 49 may be located on the outer end of the frame 6 so as to be very convenient to the operator's position when loading or unloading glass sheets.

Referring to Figures II, III and IV each of the brackets 14 includes a cylindrical portion 60 which by means of set screws 61 is adjustably locked to a stationary shaft 15. These cylindrical portions 60 are nearly as long as the shoes 8 and the spaces between them are closed by sleeves 62 (Figure IV) to give a finished appearance. The shoes 8 are each carried from its associated weight stem 9 by a pivot pin 63 so that it may rock and thus distribute its load throughout its length. Minor irregularities in the surface of the glass are absorbed by soft thin strips 64 set into the bottom edge of the shoes 8.

As seen in Figure IV the end one of the shoes 8 extends over the end of the grinding stone 1. This is because the grinding stone 1 is shown at one end of its axial travel. As the stone continues to turn it is moved axially from the position shown in Figure IV until its end has passed the end of the last one of the shoes 8. It is possible, by proper adjustment of the weight applied to the last of the shoes 8, to cause the end of the stone 1 to cut a proper bevel even though it is presented to the glass only part of the time.

The provision of the automatic mechanism for operating the weight lifting jacks and the inclusion of a timer in such automatic mechanism makes it possible for an operator to satisfactorily bevel much larger sheets of glass than he could otherwise satisfactorily handle on the machine. When the weights are deposited simultaneously and lifted simultaneously, all sections of the edge of the sheet of glass are ground for equal periods of time. The entire edge thus is uniformly beveled, a result that is very difficult for even the most skillful operator to achieve if the weights are deposited and lifted one after another. It is only by the close control of operating conditions made possible by the simultaneous deposition of the weights and precise timing of the grinding interval that high quality beveled surfaces may be produced at low cost.

The automatic mechanism above described may be supplemented by means to actuate the hydraulic cylinder manually while conducting tests to determine the proper cycle time and the proper distribution of weight along the edge to be beveled. Such means may, for example, include a stop button electrically connected to interrupt the timing cycle or a manually operable valve arranged to by-pass the electrically controlled valve. The means to actuate the hydraulic cylinder manually also may be used in case of failure of the automatic control mechanism.

It is occasionally desired to bevel glass sheets the lengths of which are less than half the length of the grinding stone. In this case it is possible to operate the machine as described by merely loading two pieces of glass onto the framework 6 and allowing them to grind for the same length of time. It is also possible to duplicate the weight lifting mechanism so that one such mechanism handles one set of weights and the other handles another set so that one piece of glass may be grinding while the operator is loading the other side of the machine. In such a case the structures are identical with that described and the operation is exactly the same with the only exception that the operator does not have to wait for the finish of the grinding operation on one piece before he reloads the other side of the machine. Thus slightly more efficient use of his time may result by alternately loading the sides of the machine instead of simultaneous loading of the entire machine.

Various modifications in details of construction may be made without departing from the spirit and scope of the invention.

Having described the invention, I claim:

1. In a glass beveling machine, in combination, a grinding stone to which the to be beveled edge of the glass is presented, means for oscillating the glass around the edge being beveled to distribute the grinding across the face of the bevel being cut, a plurality of weighted shoes for forcing the edge of the glass against the grinding stone, means whereby the weighting of each shoe may be varied, a lifter for each shoe, a rockable shaft that has an arm operatively connected to each of the lifters, mechanical means for rocking said shafts, manually operable means for initiating a movement of the mechanical means to lower the shoes into engagement with the glass, and a timer started by said means for initiating a reverse movement of the mechanical means after a predetermined grinding interval.

2. In a glass beveling machine, in combination, a grinding cylinder to which the to be beveled edge of the glass is presented, a support frame for the glass, means for oscillating the frame about an axis generally coincident with the line of contact of the glass and cylinder, a plurality of individually weighted shoes for holding the glass against the cylinder, a jack for each shoe, a shaft extending along said plurality of shoes, an arm and linkage extending from said shaft adjacent each jack, said linkages being operatively connected to the jacks and disconnectable from the arm, a motor operatively connected to oscillate said shaft, manual control means for starting the motor, and a timer started by the manual control means for reversing the motor after a predetermined time interval.

3. In a machine for beveling glass, in combination, a plurality of individually weighted shoes for holding an edge of the glass against a grinding cylinder, an individual lifter for each shoe, a shaft extending along the plurality of lifters, linkage including an arm fixed to the shaft for operatively connecting each lifter to the shaft, a fluid actuated cylinder operatively connected to oscillate the shaft, manually operated control means for actuating the cylinder to deposit the shoes on the glass, and a timer that is started by operation of the control means and that is connected to the control means to release the cylinder and raise the shoes from the glass.

4. In a machine for beveling glass, in combination, a plurality of individually weighted shoes for holding an edge of the glass against a grinding cylinder, an individual lifter for each shoe, a shaft extending along the plurality of lifters, linkage including an arm fixed to the shaft for operatively connecting the shaft to the adjacent lifter, a fluid actuated cylinder operatively connected to oscillate the shaft, an electrically actuated valve for controlling the flow of fluid to said cylinder, and a control circuit for the valve comprising a manual start control and a timer, said timer serving to hold the circuit to the valve closed for a predetermined time after each actuation of the manual start control.

5. In a machine for beveling glass, in combination, a plurality of individually weighted shoes for holding an edge of the glass against a grinding cylinder, an individual jack for each shoe, a control shaft, linkage connecting the control shaft to at least one of the jacks, a hydraulic cylinder operatively connected to the control shaft, an electrically actuated valve for controlling the flow of fluid to the cylinder, and a control circuit for the valve, the control circuit comprising a manually operable start switch and a time delay for holding the valve energized for an adjustable predetermined time after each operation of the start switch.

HOWARD H. HEFFLEY.

REFERENCES CITED

The following references are of record in the file of this patent:

UNITED STATES PATENTS

| Number | Name | Date |
|---|---|---|
| 446,196 | Wiederer | Feb. 10, 1891 |
| 2,379,281 | Cramer | June 26, 1945 |
| 2,425,234 | Erwin et al. | Aug. 5, 1947 |

FOREIGN PATENTS

| Number | Country | Date |
|---|---|---|
| 580,616 | Germany | Sept. 3, 1931 |